United States Patent [19]

Schacht et al.

[11] Patent Number: 5,104,947

[45] Date of Patent: Apr. 14, 1992

[54] POLYPHOSPHAZENES AND THEIR SYNTHESIS

[75] Inventors: Etienne Schacht, Staden; Jan Crommen, Gent, both of Belgium

[73] Assignee: Ethyl Corporation, Richmond, Va.

[21] Appl. No.: 389,982

[22] Filed: Aug. 7, 1989

[51] Int. Cl.$^5$ .................. C08F 283/00; C08G 79/02; C08L 85/02

[52] U.S. Cl. .................. 525/538; 528/398; 528/399

[58] Field of Search .................. 525/538; 528/398, 399

[56] References Cited

PUBLICATIONS

J. H. Goedemoed and K. de Groot, "Development of Biodegradable Controlled Release Systems Based on Polyphosphazenes", IUPAC; Jerusalem, Isreal, Aug. 16-21, 1987.

J. H. Goedemoed and K. deGroot, "Development of Biodegradable Controlled Release Systems Based on Polyphosphazenes," IUPAC International Symposium on Polymers for Advanced Technologies, Programs and Abstracts, Jerusalem, Israel, Aug. 16-21, 1987, p. 116.

J. H. Goedemoed and K. deGroot, "Development of Implantable Antitumor Devices Based on Polyphosphazene," Makromol. Chem., Macromol. Symp. 1988, 19, 341-365.

Primary Examiner—Harold D. Anderson
Assistant Examiner—T. Mosley
Attorney, Agent, or Firm—Doris M. Thompson; Richard J. Hammond

[57] ABSTRACT

Described are polyphosphazenes which may be represented by the general formula

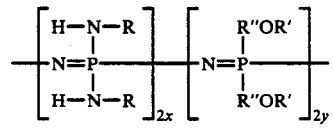

in which R is a hydroxy-substituted or protected hydroxy-substituted saturated aliphatic group, R' is a hydrocarbyl group, R" is a residue of an alpha amino acid, n is from about 50 to about 25,000, and x is a number averaging from 0.05 to 1.00 per repeating unit and y is a number averaging from 0.95 to 0.00 per repeating unit so that per repeating unit the sum of x and y is 1. Removal of the protecting group in the R moiety renders the polymers water soluble. The polymers have a controllable set of properties including degree of hydrolytic stability, permeability, hydrophilicity, and bioacceptability. They may be used in the production of hydrogels for drug release systems, plasma extenders, and biomedical implants.

49 Claims, 1 Drawing Sheet

REDUCED VISCOSITY OF $[NP(NH-CH_2-CH_2-CH_2-OH)_2]_n$ IN WATER AS A FUNCTION OF TIME

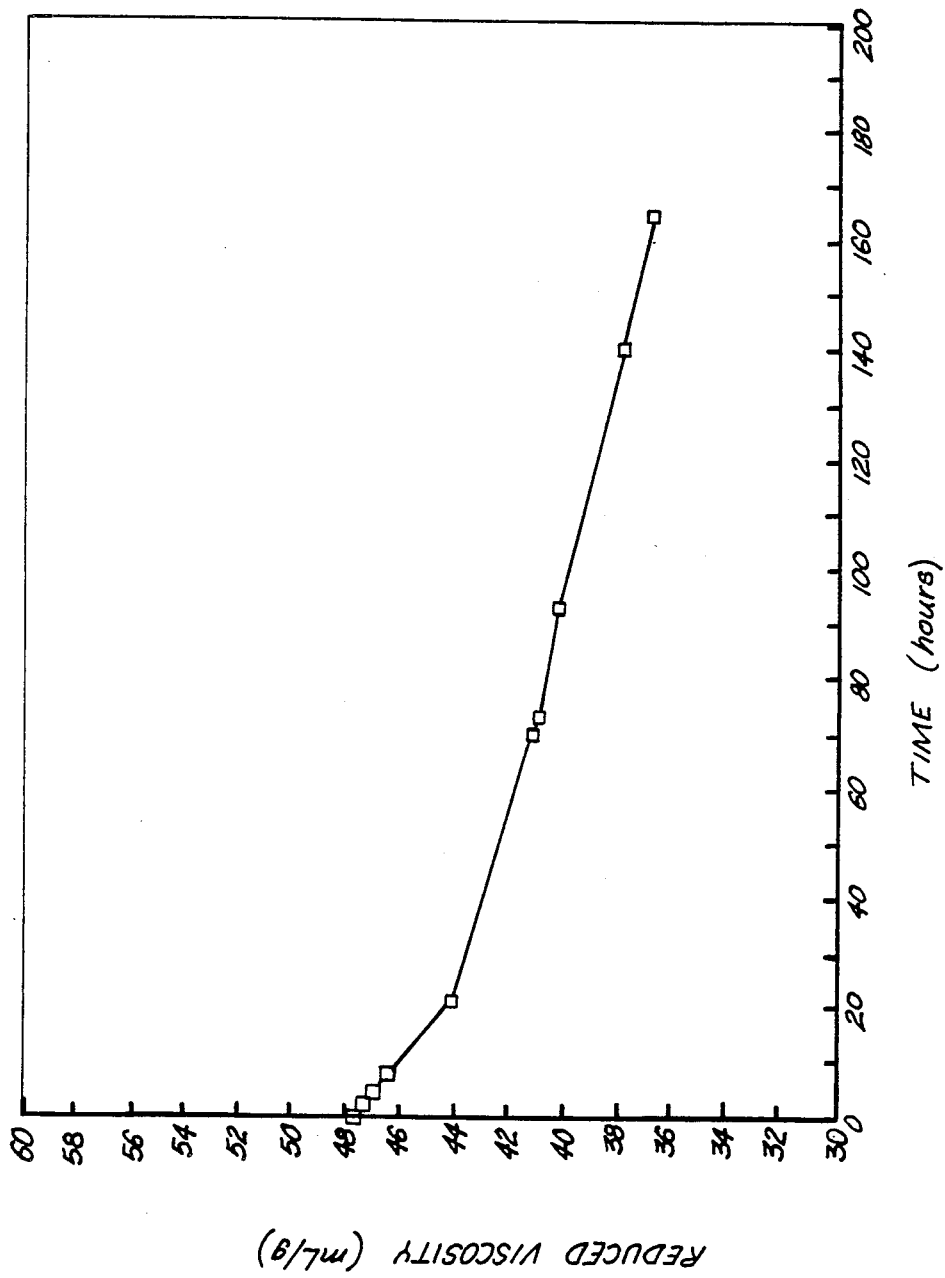

POLYPHOSPHAZENES AND THEIR SYNTHESIS

TECHNICAL FIELD

This invention relates to a new class of bioerodable phosphazene polymers, and to methods for their production.

BACKGROUND

Water-soluble, biocompatible polymers are of interest for possible biomedical applications such as formation of hydrogels for use as membranes, structural materials, or matrices for the immobilizaton of bioactive agents.

In U. S. Pat. No. 3,893,980 and in *Macromolecules,* 1977. Vol. 10, No. 4, pages 824–830, H. R. Allcock et al. describe the synthesis of phosphazene high polymers with glycino ethyl ester, alanino methyl ester, leucino methyl ester, and phenylalanino methyl ester substituents by the interaction of poly(dichlorophosphazene) with amino acid esters. Total halogen replacement was achieved only with glycine ethyl ester. Replacement of the remaining chlorine could be effected by the subsequent introduction of methylamino groups as cosubstituents. The objective of this work was to determine whether the polymers could be biocompatible as solids or biodegradable to harmless hydrolysis products. If the products proved to be soluble in aqueous media, they could possibly be used as plasma extenders or carrier molecules for chemotherapeutic drugs. As pointed out in the patent, the methylamino groups were utilized in order to impart hydrophilicity to the polymers, a feature which was deemed by the patentees to be very important.

In *Journal of Controlled Release,* 1986, Vol. 3, pages 143–154, C. W. J. Grolleman et al. describe the synthesis of bioerodable phosphazene polymers containing a model drug (phenylacetic acid) or a drug (naproxen) covalently bound to the chain through a spacer, L-lysine. Residual chlorine on the partially substituted polyphosphazene was replaced by reaction with glycine ethyl ester. Subsequent papers by Grolleman et al. (Ibid., 1986, Vol. 4 pages 119–131; and pages 133–142) describe experiments in vitro and in vivo using such naproxen-substituted polyphosphazene drug release systems.

J. Heller, U.S. Pat. No. 4,639,366, describes a controlled release device comprising (a) a polymer with at least one labile backbone bond per repeat unit and at least one pendant acid functionality per thousand repeat units, and (b) a therapeutic or biologically active agent incorporated within or prepared by reacting a polyol, preferably a diol, having a pendant acidic group with a polymer containing a labile backbone bond. Polymers mentioned for use in this reaction are polyorthoesters (including polyorthocarbonates), polyacetals, polyketals, polyesters and polyphosphazenes.

In *Macromolecules,* 1988, Vol. 21, No. 7, pp. 1980–1985, and in references cited therein, H. R. Allcock et al. describe the synthesis of certain poly(organophosphazenes) which are soluble in water and can be cross-linked to form membranes or hydrogels. The sodium salts of di(hydroxy-protected)glycerols reacted with poly(dichlorophosphazene) to produce polyphosphazenes bearing protected glyceryl side groups; subsequent deprotection yielded poly(diglycerylphosphazene) which was water soluble and cross-linkable. Interest is drawn toward these polymers (1) because the overall molecular structure of the polymer might allow hydrolytic breakdown to biologically innocuous products, and (2) because the presence of hydroxyl groups in the side units is expected (a) to generate water solubility, (b) to provide possible sites for cross-linking, and (c) to provide possible sites for the attachment of bioactive agents.

The present inventors, in prior co-pending Applications (Ser. No. 298,921, Ser. No. 298,922, Ser. No. 299,085 and 300,138, all filed Jan. 23, 1989) have disclosed novel substituted polyphosphazenes useful in the production of bioerodable devices.

The Invention

This invention provides, inter alia, a new class of phosphazene polymers having a controllable set of properties including degree of hydrolytic stability, permeability, hydrophilicity, and bioacceptability. The polymers of one embodiment of this invention are used in the production of the polymers of another embodiment of this invention. These polymers can be tailored within limits, including cross-linking, if desired, to provide release characteristics rendering them suitable for use in the production of hydrogels for drug release systems, plasma extenders, and biomedical implants. Bioactive molecules may be incorporated into these polymers by encapsulation, by chemical bonding to the polymer substituent groups, or in solution with the solvent in a solvent-swollen, cross-linked polymer. In addition, these new polymers may be used as additives in pharmaceutical formulations. Still other applications for these polymers may occur to those skilled in the art.

In accordance with one embodiment of this invention there is provided a class of essentially halogen-free polyphosphazenes which may be represented by the general formula

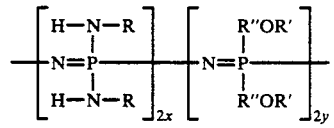

wherein R is a hydroxy-substituted or protected hydroxy-substituted saturated aliphatic group, R' is a hydrocarbyl group, R" is a residue of an alpha amino acid, n is from about 50 to about 25,000, and x is a number averaging from 0.05 to 1.00 per repeating unit so that per repeating unit the sum of x and y is 1.

In accordance with a preferred embodiment of this invention there is provided a class of essentially halogen-free polyphosphazenes which may be represented by the above general formula wherein R is a hydroxy-substituted saturated aliphatic group. It will be noted that all components of these polymers should be biocompatible and when biodegraded, as by controlled hydrolysis, should release only harmless products. In particular, the polymers are essentially halogen-free.

Polymers of the above general formula wherein R is a tri(hydrocarbyl)siloxy-substituted saturated aliphatic group constitute another preferred embodiment of this invention.

It is believed that in the copolymers of this invention, the cosubstituents on the polymer chain are randomly distributed thereon. Accordingly, the copolymers of this invention may also be considered as solid substituted phosphazene polymers having units represented by the formulas

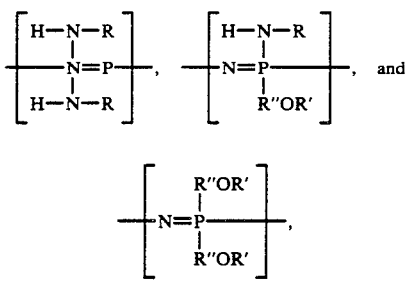

wherein R, R', and R" are as defined above.

To produce the homopolymers of this invention, the preferred process comprises (a) reacting a hydroxy-protected aminoalcohol with a dihalophosphazene polymer in a liquid reaction solvent and in the presence of a hydrogen halide acceptor to effect substitution of the halogen of the dihalophosphazene polymer by aminoalcohol groups in which the hydroxyl groups are protected, and (b) removing the protecting groups under mild conditions to produce a substituted polymer containing hydroxyl groups.

By "hydroxy-protected aminoalcohol" is meant an aminoalcohol in which each hydroxyl group is substituted by a suitable protection group such as a tri(hydrocarbyl)siloxyl group.

To produce the copolymers of this invention, the preferred process comprises (a) reacting a hydroxy-protected aminoalcohol with a dihalophosphazene polymer in a liquid reaction solvent and in the presence of a hydrogen halide acceptor to effect partial substitution of the halogen of the dihalophosphazene polymer by aminoalcohol groups in which the hydroxyl groups are protected, (b) reacting the partially substituted polymer with an ester of an alpha amino acid in a liquid reaction solvent and in the presence of a hydrogen halide acceptor to effect substitution of the remaining halogen of the partially substituted polymer by amino-acid ester groups and thereby form an essentially halogen-free substituted polymer, and (c) removing the protecting groups under mild conditions to produce a substituted polymer containing hydroxyl groups.

A hydroxy-protected aminoalcohol is used in step (a) of both the homopolymer production and the copolymer production. The preferred process for the production of the hydroxy-protected aminoalcohol comprises reacting an aminoalcohol with a blocking agent.

Details concerning the process for producing the polymers are as follows:

Formation of hydroxy-protected aminoalcohol

The aminoalcohol of this invention is used for the purpose of effecting water solubility of the phosphazene polymer (when protecting groups are removed). Thus any aminoalcohol can be used which is effective in this regard. Those which may be used include alkyl and cycloalkyl aminoalcohols, especially those with more than one alcohol functional group. Aminoalcohols with aromatic substituents may also be used, as may aminoalcohols with hetero-atoms (usually N). Some examples are 2-aminoethanol, 3-amino-1-propanol, 2-amino-2-methyl-1-propanol, 2-aminomethyl-2-propanol, 2-amino-3-phenyl-1-propanol, 2-amino-1-butanol, 4-amino-1-butanol, 2-amino-3-methyl-1-butanol, 3-amino-3-methyl-1-amino-3-methyl-1-pentanol, 6-amino-1-hexanol, 2-amino-1-hexanol, and the like. Other examples are 1-amino-1-cyclopentanemethanol, 1-aminomethyl-1-cyclohexanol, 3-aminomethyl-3,5,5-trimethylcyclohexanol, N-(3 aminopropyl)diethanolamine, 1-amino-4-($\beta$-hydroxyethyl)-piperazine, 3-amino-1,2-propanediol, 2-amino-2-ethyl-1,3-propanediol, 2-amino-2-ethyl-1,3-propanediol, 2-amino-2-methyl-1,3-propanediol, 2-amino-3-phenyl-1,3-propanediol, and similar molecules. Of these, the lower alkyl aminoalcohols are particularly preferred, especially 2-aminoethanol, 3-amino-1-propanol, and 3-amino-1,2-propanediol.

The hydroxyl group(s) of the aminoalcohol must be protected, allowing the amine functional group to replace halogenon on the polymer backbone without extensive cross-linking induced by free hydroxyl groups. Protecting groups which may be substituted for hydroxyl groups include substituted methyl and ethyl ethers, esters, carbonates, cyclic acetals and ketals, and cyclic ortho esters. The preferred protecting groups are tri(hydrocarbyl)siloxyl groups; most highly preferred are trimethylsiloxyl groups. Those blocking agents which may be used to produce the protected aminoalcohol include alkylating agents, acid chlorides or anhydrides, chloroformates, carbonyl compounds or enol ethers, and trialkyl orthoformates or ortho esters; silylating agents are preferred, however, especially tri-(hydrocarbyl)chlorosilanes, hexamethyldisilazane, silylamines and silyl amides. Most preferred is hexamethyldisilazane with trimethylsilyl chloride as catalyst.

This reaction for the protection of the aminoalcohol may be conducted in any of a wide variety of diluents or solvents provided they are inert to the reactants (in the sense that they do not hinder the reaction). Materials which may be used are tetrahydrofuran (THF), dimethoxyethane, diglyme, triglyme, toluene, xylene, cyclohexane, 1,4-dioxane, chloroform, methylene chloride, chlorobenzene, dichlorobenzene, tetrachloroethane, acetone, benzene, dimethylformamide (DMF), dimethylsulfoxide (DMSO), ether, formamide, hexane, ethyl acetate, acetonitrile, pyridine, carbon disulfide, and the like, including mixtures of two or more such materials. Most preferable, however, is a mixture of the reagents, a suspension of aminoalcohol and blocking agent together without solvent.

The conditions, of course, depend on the particular reagents used, and anyone of ordinary skill in the art can easily determine, with the aid of a few simple tests, the best conditions obtaining for a given set of reagents. For the most preferred silylating agent and the lower aminoalcohols, temperatures in the range of from about 25° C. to about 150° C. are suitable, and temperatures in the range of from about 80° C. to about 120° C. are preferable. Reaction times depend on the other conditions, of course; these temperatures require from about 6 to about 20 hours for the reaction.

Substitution of halogen in the dihalophosphazene polymer

The reaction of step (a) may involve use of any suitable dihalophosphazene polymer reacting with the protected aminoalcohol, although usually a dichlorophosphazene polymer will be employed.

The reaction of step (a) may be conducted in any of a variety of solvents such as tetrahydrofuran (THF), dimethoxyethane, diglyme, triglyme, toluene, xylene, cyclohexane, 1,4-dioxane, chloroform, methylene chloride, chlorobenzene, dichlorobenzene, tetrachloroethane, and the like, including mixtures of two or more such solvents or a suitable mixture of one or more such solvents with acetonitrile, acetone, methylethylketone, etc. The solvent employed should have the capability of keeping the dihalophosphazene polymer, the protected aminoalcohol, and the polymer product in solution. The suitability of such a solvent mixture may be easily determined by one skilled in the art by the means of a few simple tests.

Among the hydrogen halide acceptors that may be utilized in this reaction are tertiary amines such as trimethylamine, triethylamine, tripropylamine, tributylamine, trihexylamine, tetramethylethylenediamine, pyridine, 1,4-diazabicyclo[2.2.2]octane, N-methylpyrrole, N-methylmorpholine; inorganic bases such as sodium carbonate, potassium carbonate, sodium bicarbonate, or potassium bicarbonate (provided the inorganic base is soluble in the particular solvent system used); and the like. An excess of the protected aminoalcohol reactant may also serve as the hydrogen halide acceptor.

The reaction is best conducted in substantially anhydrous conditions; an atmosphere of dry nitrogen preferably serves this purpose.

Relatively mild reaction conditions are generally used, with temperatures in the range of about 0° C. to about 60° C. being typical, and about 0° C. to about 25° C. being preferred. With temperatures lower than 0° C., longer reaction times should be used, whereas with temperatures above about 25°-30° C., shorter reaction times are desirable to minimize the extent of cross-linking and hydrolytic chain cleavage that may possibly occur.

Unless the protected aminoalcohol is a relatively small molecule, complete replacement of the halogen does not occur in this reaction, and thus an excess of the protected aminoalcohol may be used, e.g., up to 10, and preferably between 2 to 2.5 equivalents relative to the amount of halogen present as halophosphazene polymer. Alternatively, the reactants may be proportioned such that there is a stoichiometric deficiency or equivalency between the amount of protected aminoalcohol and the amount of halogen present as halophosphazene polymer. The extent of the halogen replacement from the polymer chain may thus be controlled within limits by suitably proportioning the reactants.

Completion of halogen substitution in the polymer

In the preparation of the copolymers of this invention, a partially substituted polymer from step (a) is reacted in step (b) with an ester of an alpha amino acid in a liquid reaction solvent and in the presence of a hydrogen halide acceptor to effect replacement of the remaining halogen of the partially substituted polymer by amino acid ester groups. Thus these reactants should be proportioned such that there is a sufficient quantity of the amino acid ester to react with the residual halogen in the polymer. Usually it is convenient to use an amount ranging from stoichiometric up to about 100% excess of the amino acid ester.

The solvents and hydrogen halide acceptors that may be employed in this reaction are the same types that may be used in step (a).

A variety of alpha-amino acid esters (preferably alanine esters and most preferably glycine esters) may be used, such as alkyl, cycloalkyl, aryl and aralkyl esters, although the lower alkyl esters, especially the ethyl ester, are preferred.

Temperatures in the range of 0° to 150° C. are suitable.

On completion of the reaction, the intermediate product polymer can be recovered by addition of a polymer precipitant to the reaction solution or preferably by dropwise addition of the solution or the solution concentrate to the polymer precipitant. Purification of the polymer may be done by redissolving and reprecipitating the polymer. The intermediate product polymers are usually soluble in chloroform, benzene, THF (tetrahydrofuran), and similar solvents. These polymers are usually insoluble in water, alcohols, alkanes, acetone, acetonitrile, and similar substances. Thus, materials which may be found suitable for precipitating and for purifying the intermediate product polymer include n-pentane, n-hexane, acetonitrile, methanol, ethanol, isopropanol, acetone, water, or appropriate mixtures of such substances. Purifying the product by precipitation from chloroform into an excess of acetonitrile is highly preferred.

The intermediate product polymer may be used immediately in the production of the final polymer, or it may be dried and stored for other uses or for later use in the process of this invention.

Removal of protecting groups

The last step, step (c) of the preparation of the copolymers of this invention or step (b) of the preparation of the homopolymers of this invention, is the removal of the protecting groups. In the preferred case of silylether protecting groups, it is preferred to remove them under mild conditions, as taught by Corey and Snider (*J. Amer. Chem. Soc., Comm.* 1972, 94, 2549–2550), in order to avoid the possibility of further reactions by the liberated hydroxyl group if the usual hydrolysis methods were used (potassium carbonate in methanol; ammonium chloride in THF-water; ammonium chloride in THF-methanol). Accordingly, hydrolysis under milder conditions, such as anhydrous tetrabutylammonium fluoride in tetrahydrofuran, is highly preferred.

As in the case of the intermediate polymer product, the final polymer product can be recovered by addition of a polymer precipitant to the reaction solution or preferably by dropwise addition of the solution or the solution concentrate to the polymer precipitant. Purification of the polymer may be done by redissolving and reprecipitating the polymer. The final product polymers are soluble in water, and usually also in dimethylsulfoxide (DMSO), formamide, dimethyl formamide, and similar solvents. They are usually insoluble in chloroform, benzene, THF, and similar solvents. Thus, materials which may be found suitable for precipitating and for purifying the final product polymer include n-pentane, n-hexane, chloroform, benzene, diethylether, THF, or appropriate mixtures of such substances. Purifying the product by precipitation from water into an excess of THF is highly preferred.

The following examples illustrate the synthesis procedures that may be used to produce the novel polymers of this invention.

EXAMPLE 1

Synthesis of 3-amino-1,2-bis(trimethylsiloxy)propane

A 15.4 g (0.17 mole) portion of 3-amino-1,2-propanediol (dried over CaO) was suspended in 69.62 ml (0.33 mole) of distilled hexamethyldisilazane, and 5 drops of trimethylsilylchloride were added. The reaction mixture was then stirred at 110° C. during 18–20 h; ammonia was evolved. The crude reaction reduced pressure (bp. 129°–131° C. at 16–17 mm Hg). The yield of 3-amino-1,2-bis(trimethylsiloxy)propane was 32.6 g (80%).

EXAMPLE 2

Synthesis of poly[(3-amino-1,2-bis(trimethylsiloxy)propaneco(ethyl glycinate)]phosphazene All reactions were carried out under an atmosphere of dry nitrogen. The 32.6 g (0.138 mole) of 3-amino-1,2-bis(trimethylsiloxy)propane from Example 1 was transferred into a 1000 ml two-neck flask containing 300 ml dry benzene and was then cooled with ice to 5° C. To this, a solution of 3.2 g (0.0275 mole $NPCl_2$) of poly[dichlorophosphazene] in 220 ml dry benzene was added dropwise. The mixture was stirred at 5° C. for 22 h. Meanwhile, dried glycine ethyl ester (15.4 g, 0.11 mole) was transferred into a 500 ml flask containing 300 ml of dry benzene and 16 ml of triethylamine. The mixture was stirred at reflux for 3.5 h, and a small amount of benzene was distilled off. The mixture was then cooled and filtered under dry $N_2$. After the reaction of the protected aminoalcohol with the polymer had stopped, the separately prepared ethyl glycinate solution in benzene was added to this reaction mixture at 5° C. The solution was stirred for an additional 22 h at room temperature. After removal of insoluble hydrochloride salts by filtration (the precipitate was washed several times with benzene), the polymer solution was concentrated by vacuum evaporation at 30°–35° C. Dropwise addition of the concentrate to 500 ml of acetonitrile yielded a white solid polymer. Precipitation techniques were repeated until the polymer showed a negative Beilstein test for chlorine. The yield of [NP(NH—$CH_2$—CH(OSi($CH_3$)$_3$)—$CH_2$—OSi($CH_3$)$_3$)$_{1.4}$ (GlyOEt)$_{0.6}$]$_n$ was 4.9 g (41%).

EXAMPLE 3

Synthesis of poly[(3-amino-1,2-propanediol)co(ethyl glycinate)]phosphazene

To a solution of 2 g of the product of Example 2 in 100 ml THF (tetrahydrofuran), a solution of 3.05 g tetrabutylammonium fluoride (TBAF) in 30 ml THF was added. Vigorous stirring was continued during 10–30 s. This resulted in the formation of a coagulated polymer precipitate which was removed from the reaction mixture and dried under vacuum. The polymer was then dissolved in 20 ml of water and dropwise addition of this polymer solution into 200 ml of THF yielded a white solid polymer. It appeared that incorporated THF could not be removed completely from the polymer under high vacuum. Therefore, the polymer was dissolved again in 20 ml of water, and water and THF were removed by freeze-drying. The yield of [NP(NH—$CH_2$—CH(OH)—$CH_2$—OH)$_{1.4}$(GlyOEt)$_{0.6}$]$_n$ was 1.2 g (72%).

The structures of the polymers and of the starting protected aminoalcohols were confirmed by a combination of IR and $^1$H-NMR spectroscopy. Typical glass transition temperatures or melting temperatures (Tg or Tm; DSC) for representative polymers of this invention are as follows:

| POLYMER | $T_g$(°C.) | $T_m$(°C.) |
|---|---|---|
| [NP(NH—$CH_2$—$CH_2$—OSi($CH_3$)$_3$)$_2$]$_n$ | (*) | 34 |
| [NP(NH—$CH_2$—$CH_2$—$CH_2$—OSi($CH_3$)$_3$)$_2$]$_n$ | (*) | (**) |
| [NP(NH—$CH_2$—CH(OSi($CH_3$)$_3$)—$CH_2$—OSi($CH_3$)$_3$)$_{1.4}$(GlyOEt)$_{0.6}$]$_n$ | −5 | (**) |
| [NP(NH—$CH_2$—$CH_2$—OH)$_2$]$_n$ | −7 | (**) |
| [NP(NH—$CH_2$—$CH_2$—$CH_2$—OH)$_2$]$_n$ | −5 | (**) |
| [NP(NH—$CH_2$—CH(OH)—$CH_2$—OH)$_{1.4}$(GlyOEt)$_{0.6}$]$_n$ | 18 | (**) |

(*) No glass transition detected between 220 and 380K.
(**) No melting transition detected.

The stability of a representative polymer in pure water was also tested by means of viscosity measurements. In the FIGURE of the Drawing the reduced viscosity of a 2% solution of [NP(NH—$CH_2$—$CH_2$—$CH_2$—OH)$_2$]$_n$ is plotted as a function of time. The FIGURE illustrates that the reduced viscosity of these polymers in water declines as a function of time, probably due to hydrolytic degradation of the polymer.

Conventional methods are applicable for transforming the polymers of this invention into suitable shapes for use as body implants or other bioapplications. The polymers may be used for forming gels, plaques, sheets, filaments, capsules, time-release coatings on encapsulations, and other molded entities.

The foregoing disclosure has been presented for purposes of illustration and not limitation. As can readily be appreciated by those skilled in the art, this invention is susceptible to considerable variation in its practice within the spirit and scope of the ensuing claims.

What is claimed is:

1. A substituted phosphazene polymer having repeating units represented by the general formula

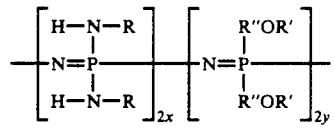

wherein R is a hydroxy-substituted or protected hydroxy-substituted saturated aliphatic group, R' is a hydrocarbyl group, R" is a residue of an alpha amino acid, n is from about 50 to about 25,000, and x is a number averaging from 0.05 to 1.00 per repeating unit and y is a number averaging from 0.95 to 0.00 per repeating unit so that per repeating unit the sum of x and y is 1.

2. A substituted phosphazene polymer of claim 1 wherein R is a hydroxy-substituted saturated aliphatic group.

3. A polymer of claim 2 wherein R" is Gly.

4. A polymer of claim 3 wherein R' is a lower alkyl group.

5. A polymer of claim 3 wherein R' is ethyl.

6. A polymer of claim 2 wherein R is a hydroxy-substituted alkyl group.

7. A polymer of claim 6 wherein R is hydroxyethyl.

8. A polymer of claim 7 wherein x is about 1.0 and y is about 0.0.

9. A polymer of claim 6 wherein R is hydroxypropyl.

10. A polymer of claim 9 wherein x is about 1.0 and y is about 0.0.

11. A polymer of claim 6 wherein R is dihydroxypropyl.

12. A polymer of claim 11 wherein x is about 0.7 and y is about 0.3.

13. A polymer of claim 1 wherein R is a tri(hydrocarbyl)siloxy-substituted saturated aliphatic group.

14. A polymer of claim 1 wherein R is a trimethylsiloxy-substituted saturated aliphatic group.

15. A solid substituted phosphazene polymer in which on the average the units of the polymer have the formula

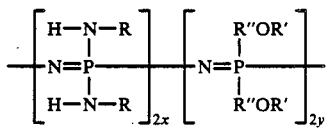

wherein R is a hydroxy-substituted or protected hydroxy-substituted saturated aliphatic group, R' is a hydrocarbyl group, R" is a residue of an alpha amino acid, and x is a number averaging from 0.05 to 1.00 per repeating unit and y is a number averaging from 0.95 to 0.00 per repeating unit so that per repeating unit the sum of x and y is 1.

16. A polymer of claim 15 wherein R is a hydroxysubstituted saturated aliphatic group.

17. A polymer of claim 16 wherein R" is Gly.

18. A polymer of claim 16 wherein R' is ethyl.

19. Poly[bis(2-aminoethanol)phosphazene], a polymer of claim 16.

20. Poly[bis(3-amino-1-propanol)phosphazene], a polymer of claim 16.

21. Poly[(3-amino-1,2-propanediol)co(ethyl glycinate)phosphazene], a polymer of claim 17.

22. A polymer of claim 15 wherein R is a trialkylsiloxy-substituted saturated aliphatic group.

23. A polymer of claim 15 wherein R is a trimethylsiloxy-substituted saturated aliphatic group.

24. Poly[bis(2-amino-1-trimethylsiloxyethane)phosphazene], a polymer of claim 23.

25. Poly[bis(3-amino-1-trimethylsiloxypropane)phosphazene], a polymer of claim 23.

26. Poly[(3-amino-1,2-bis(trimethylsiloxy)propane)-co(ethyl glycinate)phosphazene], a polymer of claim 23.

27. A solid substituted phosphazene polymer having units represented by the formulas

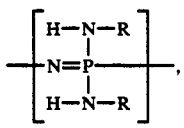

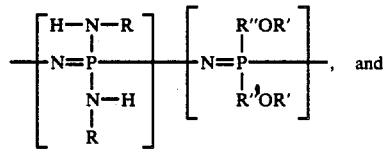, and

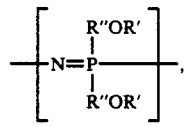, wherein R is a hydroxy-substituted or protected hydroxy-substituted saturated aliphatic group, R' is a hydrocarbyl group, and R" is a residue of an alpha amino acid.

28. A polymer of claim 27 wherein R is a hydroxy-substituted saturated aliphatic group.

29. A polymer of claim 28 wherein R" is Gly.

30. A polymer of claim 28 wherein R' is ethyl.

31. A polymer of claim 28 wherein R is a tri(hydrocarbyl)siloxy-substituted saturated aliphatic group.

32. A polymer of claim 28 wherein R is a trimethylsiloxy-substituted saturated aliphatic group.

33. A process for the production of a substituted polymer which comprises
(a) reacting a hydroxy-protected aminoalcohol with a dihalophosphazene polymer in a liquid reaction solvent and in the presence of a hydrogen halide acceptor to effect substitution of the halogen of the dihalophosphazene polymer by aminoalcohol groups in which the hydroxyl groups are protected, and
(b) removing the protecting groups under mild conditions to produce a substituted polymer containing hydroxyl 34. A process of claim 33 wherein the dihalophosphazen polymer is a dichlorophosphazene polymer.

35. A process of claim 33 wherein said hydroxy-protected aminoalcohol is produced by reacting an aminoalcohol with a blocking agent.

36. A process of claim 35 wherein said blocking agent is a silylating agent.

37. A process of claim 35 wherein said blocking agent is hexamethyldisilazane with trimethylsilyl chloride as catalyst.

38. A process of claim 35 wherein said aminoalcohol is 2-aminoethanol.

39. A process of claim 35 wherein said aminoalcohol is 3-amino-1-propanol.

40. A process for the production of a substituted polymer which comprises
(a) reacting a hydroxy-protected aminoalcohol with a dihalophosphazene polymer in a liquid reaction solvent and in the presence of a hydrogen halide acceptor to effect partial substitution of the halogen of the dihalophosphazene polymer by aminoalcohol groups in which the hydroxyl groups are protected,
(b) reacting the partially substituted polymer with an ester of an alpha amino acid in a liquid reaction solvent and in the presence of a hydrogen halide acceptor to effect substitution of the remaining halogen of the partially substituted polymer by amino-acid ester groups and thereby form an essentially halogen-free substituted polymer, and
(c) removing the protecting groups under mild conditions to produce a substituted polymer containing hydroxyl 41. A process of claim 40 wherein the dihalophosphazene polymer is a dichlorophosphazene polymer.

42. A process of claim 40 wherein said hydroxy-protected aminoalcohol is produced by reacting an aminoalcohol with a blocking agent.

43. A process of claim 42 wherein said blocking agent is a silylating agent.

44. A process of claim 42 wherein said blocking agent is hexamethyldisilazane with trimethylsilylchloride as catalyst.

45. A process of claim 42 wherein said aminoalcohol is 2-aminoethanol.

46. A process of claim 42 wherein said aminoalcohol is 3-amino-1-propanol.

47. A process of claim 42 wherein said aminoalcohol is 3-amino-1 2-propanediol.

48. A process of claim 40 wherein the ester of step (c) is a glycine ester.

49. A process of claim 48 wherein said ester is ethyl glycinate.

* * * * *